(12) United States Patent
Maucher et al.

(10) Patent No.: US 7,478,630 B2
(45) Date of Patent: Jan. 20, 2009

(54) DEVICE AND METHOD FOR COOLING EXHAUST GAS

(75) Inventors: Ulrich Maucher, Korntal-Münchingen (DE); Jens Ruckwied, Stuttgart (DE)

(73) Assignee: BEHR GmbH & Co. KG, Stuttgart (DE)

( * ) Notice: Subject to any disclaimer, the term of this patent is extended or adjusted under 35 U.S.C. 154(b) by 154 days.

(21) Appl. No.: 11/690,481

(22) Filed: Mar. 23, 2007

(65) Prior Publication Data

US 2007/0221181 A1   Sep. 27, 2007

(30) Foreign Application Priority Data

Mar. 24, 2006   (DE) .................. 10 2006 014 188

(51) Int. Cl.
 F02M 25/07 (2006.01)
 F02B 47/08 (2006.01)
 F28F 3/12 (2006.01)
 F28F 1/14 (2006.01)

(52) U.S. Cl. ............... 123/568.12; 165/51; 165/151; 165/157; 165/166; 165/183

(58) Field of Classification Search ............ 123/568.12; 60/320, 321; 165/41, 51, 151–153, 157, 165/166, 167, 172, 175–177, 183
See application file for complete search history.

(56) References Cited

U.S. PATENT DOCUMENTS

| | | | |
|---|---|---|---|
| 6,247,523 B1 | | 6/2001 | Shibagaki et al. |
| 6,595,274 B2 * | | 7/2003 | Hayashi et al. ........ 123/568.12 |
| 7,032,577 B2 * | | 4/2006 | Rosin et al. ............ 123/568.12 |
| 7,198,037 B2 * | | 4/2007 | Sayers et al. ........... 123/568.12 |
| 2007/0017661 A1 * | | 1/2007 | Geskes et al. ............... 165/166 |
| 2007/0051095 A1 | | 3/2007 | Lutz |
| 2007/0125527 A1 * | | 6/2007 | Flik et al. ..................... 165/167 |
| 2008/0202735 A1 * | | 8/2008 | Geskes et al. ............... 165/166 |

FOREIGN PATENT DOCUMENTS

| | | | | |
|---|---|---|---|---|
| DE | 101 12 257 A1 | 10/2001 | | |
| DE | 600 00 493 T2 | 2/2003 | | |
| DE | 103 15 069 A1 | 11/2003 | | |
| DE | 10 2004 042 454 A1 | 4/2005 | | |
| EP | 13 88 720 A2 | 2/2004 | | |
| GB | 23 88 423 A | 11/2003 | | |
| JP | 2000-204941 A | * | 7/2000 | ................. 165/166 |
| JP | 2005-98617 A | * | 4/2005 | ................. 165/166 |

* cited by examiner

*Primary Examiner*—Willis R Wolfe, Jr.
(74) *Attorney, Agent, or Firm*—Foley & Lardner LLP (57) ABSTRACT

A device for cooling exhaust gas from an internal combustion engine comprises a plurality of flow ducts which are connected to an exhaust gas recirculation system of the internal combustion engine, a heat exchanger for a coolant to flow around the flow ducts in order to dissipate the exhaust gas heat, and an insert 7, 7' which is arranged within at least one of the flow ducts. The insert 7, 7' is in thermal contact with the flow duct such that the exhaust gas flows at least partially around the insert. The insert 7, 7' has profiled fins 8, 8', with profiles 9, 9' which are successive in the flow direction of the exhaust gas being arranged so as to be laterally offset relative to one another.

25 Claims, 5 Drawing Sheets

DEVICE AND METHOD FOR COOLING EXHAUST GAS

CROSS-REFERENCE TO RELATED PATENT APPLICATIONS

The right of foreign priority is claimed under 35 U.S.C. § 119(a) based on Federal Republic of Germany Application No. 10 2006 014 188.1, filed Mar. 24, 2006, the entire contents of which, including the specification, drawings, claims and abstract, are incorporated herein by reference.

BACKGROUND OF THE INVENTION

The invention relates to a device and also a method for cooling exhaust gas.

In designing heat exchangers for cooling exhaust gas, in particular of vehicle internal combustion engines, most particularly of diesel engines, it is necessary to take into consideration specific features which do not permit the general application of other devices used for cooling fluids. One of the specific features in the cooling of exhaust gases of internal combustion engines is the high loading with particulates, water, acids and to some extent long-chain hydrocarbons, with very intense and frequent fluctuations in temperature during operation. As a result of condensation and particulate deposition in the condensate, viscous to hard deposits are therefore formed on the cooled surfaces during the course of the service life of the heat exchanger. These deposits lead to an increased flow resistance and a degradation of the heat exchanger performance.

SUMMARY OF THE INVENTION

It is an object of the present invention to provide an improved device for cooling an exhaust gas stream.

A further object of preferred aspects of the invention resides in providing an improved device for cooling an exhaust gas stream in which the degradation of flow resistance and of heat exchanger performance is reduced in long-term operation.

Still another object of the invention is to provide an improved method of cooling exhaust gas by using the device according to the invention.

In accomplishing these objects, there has been provided according to one aspect of the invention an exhaust gas recirculation device for cooling exhaust gas from an internal combustion engine, comprising a plurality of exhaust flow ducts which are connected to an exhaust gas recirculation system of the internal combustion engine, a heat exchange system providing a coolant to flow around the flow ducts in order to dissipate exhaust gas heat, an insert which is arranged within and in thermal contact with at least one of the flow ducts, to permit exhaust gas to flow at least partially around the insert in a principal direction of exhaust gas flow, wherein the insert comprises a plurality of profiled fins extending laterally across the at least one flow duct and arranged successively in the principal direction of exhaust gas flow, with the individual profiles of the profiled fins which are located successive in the principal flow direction of the exhaust gas being arranged so as to be laterally offset relative to one another.

According to another aspect of the present invention, there is provided a method for cooling exhaust gas from an internal combustion engine, comprising passing exhaust gas through an exhaust gas recirculation device as defined above.

Further objects, features and advantages of the present invention will become apparent from the detailed description of preferred embodiments that follows, when considered together with the accompanying figures of drawing.

BRIEF DESCRIPTION OF THE DRAWINGS

In the drawings;

FIG. 7 is a diagram in which the longitudinal pitch L is plotted against the angle of the walls W.

DETAILED DESCRIPTION OF THE PREFERRED EMBODIMENTS

Tests have shown the surprising effect that an insert having profiled fins has a comparatively low tendency to accumulate deposits despite its smaller throughflow cross sections compared to other inserts. It was fundamentally to be feared that turbulence inserts having profiled fins would lead to increased blockage of individual throughflow channels or passageways, on account of the finely-dimensioned structure of the profiled fins. This is however the case to a surprisingly small degree, in particular if the webs of the profiled fins are relatively short in length. One possible explanation for this could be that deposition of the particulates is reduced as a result of the turbulent exhaust gas flow which is present over large parts of the profiled fin insert, whereas in the case of relatively long, uniformly shaped ducts, regular flow patterns are formed which, in the vicinity of the wall, promote the deposition of particulates as a result of the very low flow speed there.

By profiled fins is meant heat exchange fins that are profiled across their width. The shape of the individual profiles can vary widely, for example, in the form of curved undulations or other shaped undulations. In one preferred embodiment according to the present invention the profiles have rectilinear shape, preferably in the form of rectangular undulations, characterized by side walls that are at least generally vertically oriented, most preferably essentially vertically oriented, and with top walls that are generally planar and generally oriented parallel to the main flow direction of gas through the exhaust gas flow channels.

In one preferred embodiment, the webs of the profiled fins have a length which is no greater than approximately 10 mm, preferably no greater than approximately 5 mm, and particularly preferably no greater than approximately 3 mm. Different specific requirements for the pressure drop across the exhaust gas heat exchanger depend on the available installation space and the internal combustion engine. Selection of one of the length ranges specified above preferably depends on the applicable requirements.

It is additionally preferable for a density of the profiles of the profiled fins transversely with respect to the exhaust gas flow direction to be between approximately 20 profiles/dm and approximately 50 profiles/dm, preferably between approximately 25 profiles/dm and approximately 45 profiles/dm. These profile densities have been proven in tests to be particularly suitable. In particular, the profile densities particularly advantageously constitute a good compromise between the risk of blockage and the cooling performance.

With regard to a height of the profiled fins, it is to be taken into consideration that, in the case of large heights, only proportionately small primary faces, that is to say surfaces which are cooled by means of coolant and via which the entire heat must be dissipated into the coolant, are available. In the case of relatively small primary faces, the risk of coolant boiling is then increased in the case of a liquid coolant. In addition, the efficiency of the inserts decreases with increasing height of the profiled fins. A preferred height of the insert or profiled fin is therefore between approximately 3.5 mm and approximately 10 mm, more preferably between approximately 4 mm and approximately 8 mm and particularly preferably between approximately 4.5 mm and approximately 6 mm.

In a preferred embodiment of the device according to the invention, an oxidation catalytic converter is arranged upstream of the plurality of flow channels. It is generally possible by means of this type of catalytic converter to reduce the particulate sizes, the particulate densities and the proportions of hydrocarbons in the exhaust gas by means of oxidation. Here, it can be additionally or alternatively provided that the inserts themselves are provided with a coating for catalytically oxidizing the exhaust gas. In connection with the use of an oxidation catalyst preferably the density of the profiled fins transversely with respect to the exhaust gas flow direction is more than approximately 50 profiles/dm, in particular approximately 75 profiles/dm. This provides a particularly high heat exchanger performance for an available installation space, without there being the long-term risk of blockages as a result of deposits.

In a particularly preferred embodiment, the profiled fins are obliquely-toothed, i.e. the side walls of the profiles run at an angle with respect to the main flow direction of the exhaust gas (which is the direction in which the profiled fins extend). Obliquely-toothed fins are, according to experimental findings, particularly suitable for ensuring high long-term stability of the exhaust gas heat exchanger against deposits. In a preferred embodiment, the angle between the web walls and the main direction of the profiled fins is between approximately 1° and approximately 45°. In a particularly preferred embodiment, the angle is between approximately 5° and approximately 25°. In an alternative embodiment, the angle may be between approximately 25° and approximately 45°. The first mentioned value range 5° to 25° is particularly suitable in typical applications which are highly sensitive to pressure losses, with the second mentioned value range being suitable for obtaining an optimum performance density, in particular in applications which are less sensitive to pressure losses.

In optimizing an insert having obliquely-toothed profiled fins, it is generally possible to determine a correlation between the angle of the walls and the longitudinal pitch (spaced repetition) of the profiled fins. Optimum embodiments having small angles can have larger pitches than optimum embodiments having large angles. Small angles of incidence produce embodiments with a more moderate pressure loss. Large angles of incidence produce embodiments with an optimized performance density. With small angles of incidence in particular, the longitudinal pitch can be greater, and with large angles of incidence, the longitudinal pitch can in particular be smaller, in order to obtain optimized embodiments.

In a preferred embodiment, the device is embodied as a stacked plate heat exchanger. This embodiment is suitable both with regard to the width of a flow duct and with regard to the cost-effective production and the capacity for the combination of a heat exchanger housing with profiled fin inserts. Alternatively, however, the device can also be embodied as a tube bundle heat exchanger or as any other form of conventional heat exchanger.

In order to prevent corrosion caused by the aggressive exhaust gas, it is generally preferable for the insert to be produced from a rustproof steel, in particular stainless steel, and especially preferably from an austenitic steel.

In a further advantageous embodiment, aluminum materials can be used, with it then being particularly advantageously possible to provide suitable corrosion prevention, such as an alloy and/or a coating.

In one advantageous embodiment, the insert is formed from aluminum. The aluminum insert has a particularly low weight. It is particularly advantageously possible for the aluminum insert to be made of a corrosion resistant alloy or coating.

Further according to the invention, a device as described above can be used for cooling an exhaust gas stream from a motor vehicle engine.

Figure 1:
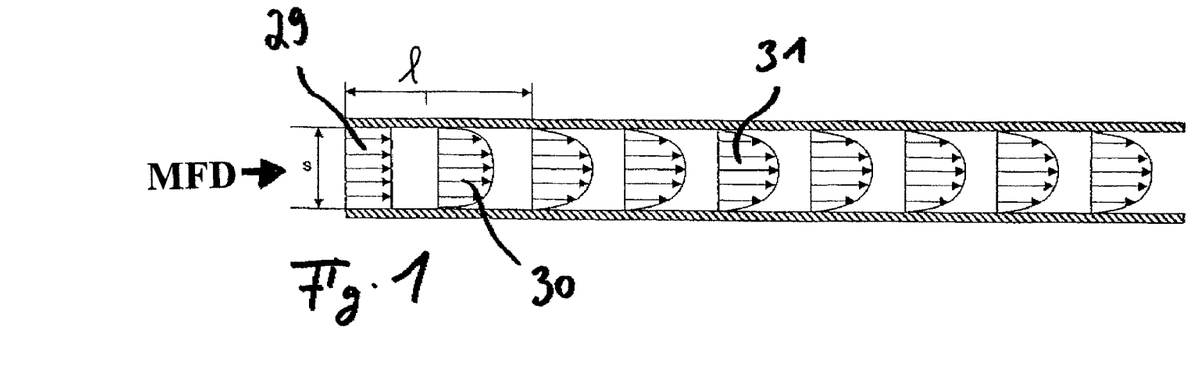
FIGS. 1 and 2 show flow profiles in the inflow region.
Figure 2:
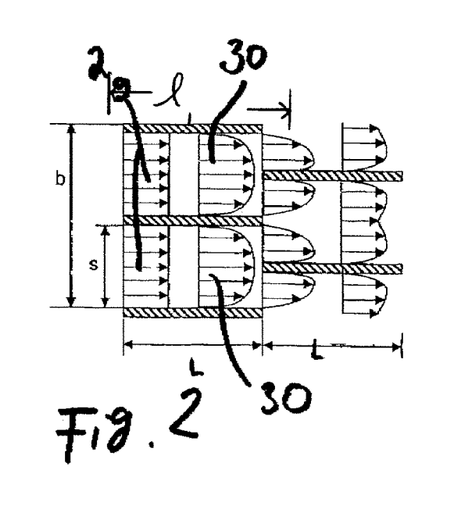

Turning now to the drawings, FIG. 1 and FIG. 2 show flow profiles in the inflow region of a gas flow passageway. Basic tests on which the invention is base have shown that these profiles are attributable to a high speed at the wall, since high flow speeds at the wall considerably reduce the tendency for soot deposition. In order reduce soot deposits, the profiled fin must therefore be designed in such a way the flow speed is higher across the entire profiled fin surface than across other inserts. In relatively long ducts, the initially more rectangular flow profile 29 in the inflow region deforms to give an elongated flow profile 30 and, downstream of the inflow region, a flow profile results which no longer varies and has a so-called "ductflow" 31, which has significantly lower flow speeds at the wall. In order to obtain a reduction in soot deposits, the toothing or profiles of the profiled fins should preferably be situated to a considerable extent in the inflow region. The length of the profiled fins should preferably therefore be smaller than the length of the inflow region.

The reference character "$l_i$" denotes the inflow region. There are increased wall shear stresses in the inflow region "$l_i$". There is a reduced level of soot deposition. In addition, an increased degree of heat transfer takes place in the inflow region.

In FIG. 1, a fully-formed "duct flow" is to be found after the inflow region. The flow profile does not vary in the main flow direction (MFD).

In very narrow flow ducts, which are formed by the presence of a high density of profiles transversely with respect to the flow direction, a further effect is generated. Although in ducts of these type there are higher flow speeds at the wall than in wider ducts, narrow ducts have an increased tendency to become completely blocked. This is caused by virtue of the fact that the deposition of a thin soot layer, which cannot be completely avoided, narrows the duct cross section to such a high degree that the throughput in individual passageways is considerably reduced. As a result of the consequently reduced flow speed in these passageways, increased soot deposition takes place, which can lead to the convergence of the soot layers from both passageway sides and therefore to complete blockage, i.e., clogging, of individual passageways, which prevents a throughflow of exhaust gas.

On account of their low turbulence, straight, uniformly shaped ducts also have a higher temperature gradient transversely with respect to the flow direction. These higher temperature gradient promotes the deposition of particulates and of condensate droplets, as a result of thermophoresis, which is the transport of particulates and condensate droplets on account of a temperature gradient. Gas molecules within the gas stream have a higher temperature and therefore a higher kinetic energy than gas molecules in the vicinity of the fin webs. As a result of this difference in kinetic energy, particulates and condensate droplets are conveyed in the direction of the fin webs and are deposited there. This effect is less pronounced in the case of a homogeneous temperature distribution, as is better formed on account of the higher turbulence in the case of profiled fins, than in the case of straight, uniformly shaped ducts.

As a function of the flow parameters, in particular the Reynolds number, the parameter called "duct extent" obtained by dividing the length of the inflow region "$l_i$" by the distance "s" is approximately 2.5 to 5, and the length of the profiled fins is preferably selected to be below this value. The reference character "s" denotes the mean throughflow width between two webs of the profile and is therefore (in the illustrated embodiment of FIG. 2) determined by b/2-t, with "t" denoting the combined thickness of the metal sheet and "b" denoting the total width of the profiled fin. The preferred result is a ratio $l_i/s<4$, in particular $l_i/s<2$. In the case of a high blockage risk, as a result of a critical exhaust gas composition, then the selection should be made of $l_i/s<1.5$, in particular $l_i/s<1$.

An oblique arrangement of the webs results, at the swirl side, in a higher flow speed at the wall which counteracts the soot deposition. A further decisive advantage of obliquely-toothed profiled fins is that, in cases in which a low density of profiled fins in the flow transverse direction is required in order to avoid blockages, in particular in the case of an unfavorable exhaust gas composition, a sufficient cooling performance can be ensured despite a small fin surface.

Figure 3:
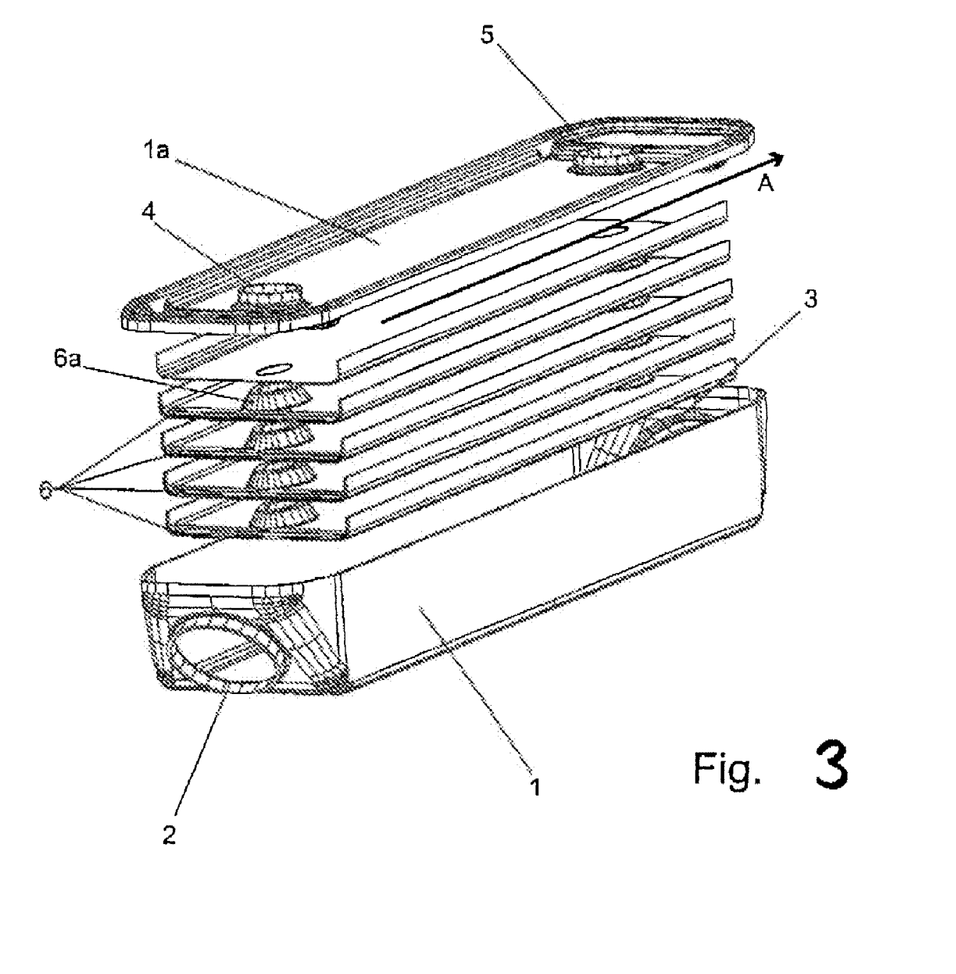
FIG. 3 is a perspective view showing a three-dimensional exploded depiction of a stacked plate heat exchanger.

The illustrative stacked plate heat exchanger according to the invention shown in FIG. 3 comprises an outer housing 1 having a cover 1a, with an inlet 2 and an outlet 3 for the exhaust gas and an inlet 4 and an outlet 5 for a liquid coolant. A plurality of plate elements 6 are provided within the housing 1a, with each of the plate elements being composed of an upper half and a lower half. The plate elements 6 are welded to one another, by means of turned-up collars 6a, and to the housing 1, 1a in such a way that the coolant flows in each case between the two halves of a plate element 6 from the inlet 4 to the outlet 5. In each case one insert (not shown in FIG. 3) having profiled fins is arranged between two plate elements 6, with the intermediate space between two plate elements 6 forming in each case one flow area for the exhaust gas. For clarity, the inserts are not illustrated in FIG. 3. The inserts are composed of a rustproof metal, preferably stainless steel. In order to improve the thermal contact between the inserts and the plate elements 6 or the housing 1, 1a, the inserts are preferably welded or soldered across their surfaces to the housing elements.

Figure 4:
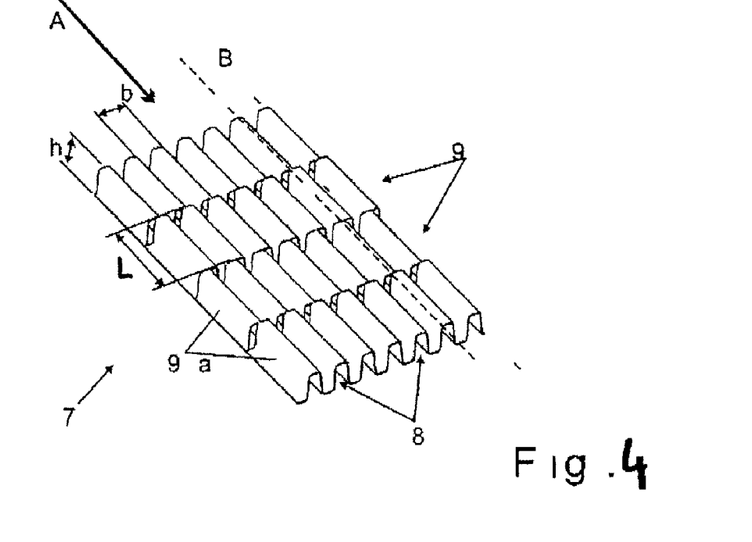
FIG. 4 is a perspective view showing a three-dimensional illustration of a detail of a straight-toothed profiled fin insert according to a first exemplary embodiment of the invention.

FIG. 4 shows an insert 7 according to a first exemplary embodiment. The arrow A shows the main flow direction of the exhaust gas. The insert 7 is composed of a thin sheet metal material into which parallel profiled fins 8 are formed by means of shaping operations. Each of the profiled fins 8 comprises a row of profiles 9, and the fins are arranged in succession in the exhaust gas flow direction. In each case two successive profiles 9 in the exhaust gas flow direction are arranged so as to be offset relative to one another transversely with respect to the exhaust gas flow direction, preferably by half a profile width, so that after each profile 9 a cut edge is adjoined or followed by a subsequent profile 9. In the present example, the profile walls 9a are aligned parallel to the flow direction of the exhaust gas and form an angle of 0° with the axis B of the profiled fins 8 or with the main flow direction of the exhaust gas A. A profiled fin insert of this type is referred to as a straight-toothed profiled fin.

In the first exemplary embodiment, the length "L" of a web 9 is approximately 4 mm. The width "b" of an individual profiled fin is defined as the width of the repeating unit of the periodic structure transversely with respect to the main flow direction of the exhaust gas. The profiled density 2/b (in the embodiment shown in FIG. 2) is, in the present example, approximately 40 profiles/dm. The width "b" of a profiled fin is therefore approximately 5 mm.

The height "h" of the profiled fins corresponds to the spacing between two adjacent plate elements 6 of the heat exchanger in FIG. 3 and, in the present case, is approximately 5 mm.

Figure 5:
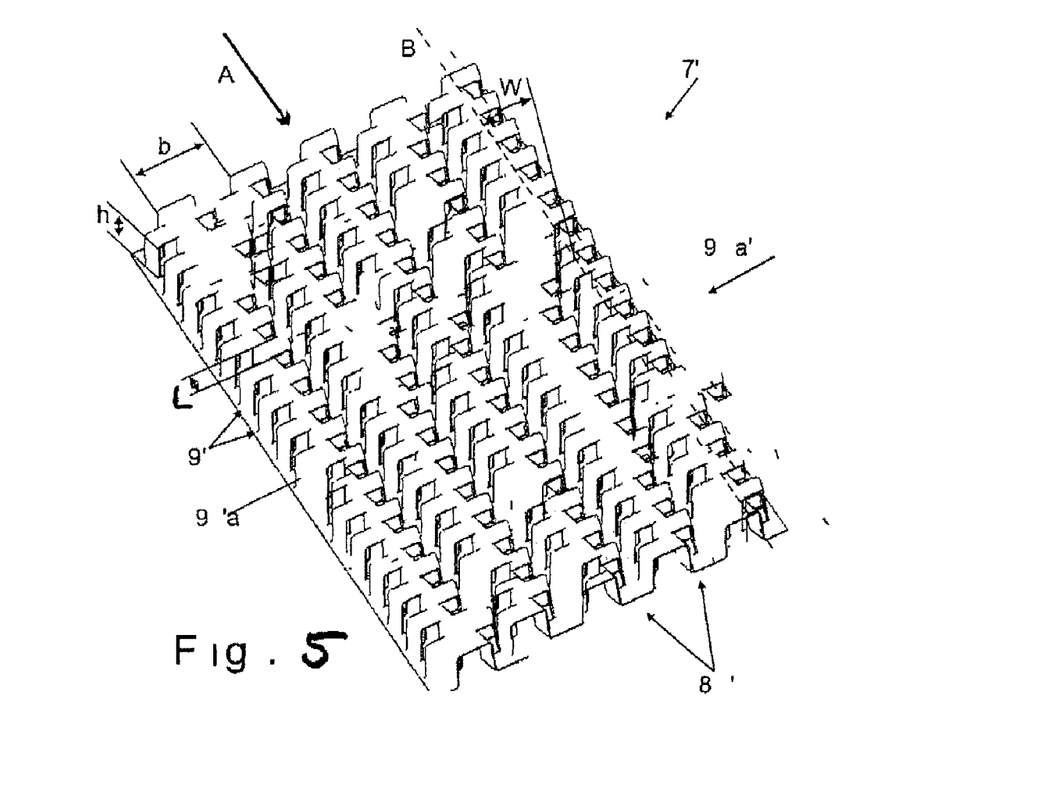
FIG. 5 is a perspective view shows a three-dimensional illustration of an obliquely-toothed profiled fin insert according to a second exemplary embodiment.

FIG. 5 shows a profiled fin insert according to a second preferred exemplary embodiment. In contrast to the first exemplary embodiment according to FIG. 4, the lateral walls 9' of the individual profiles are not aligned parallel to the main direction B of the profiled fins 8'. Instead, each of the walls 9a' of the profiles 9' forms an angle W of approximately 30° with respect to the main direction B of the profiled fins 8'. The further dimensions of the obliquely-toothed profiled fin insert 7' correspond to the dimensions of the straight-toothed profiled fins 7 from the first exemplary embodiment. The drawings are not to scale.

Figure 6:
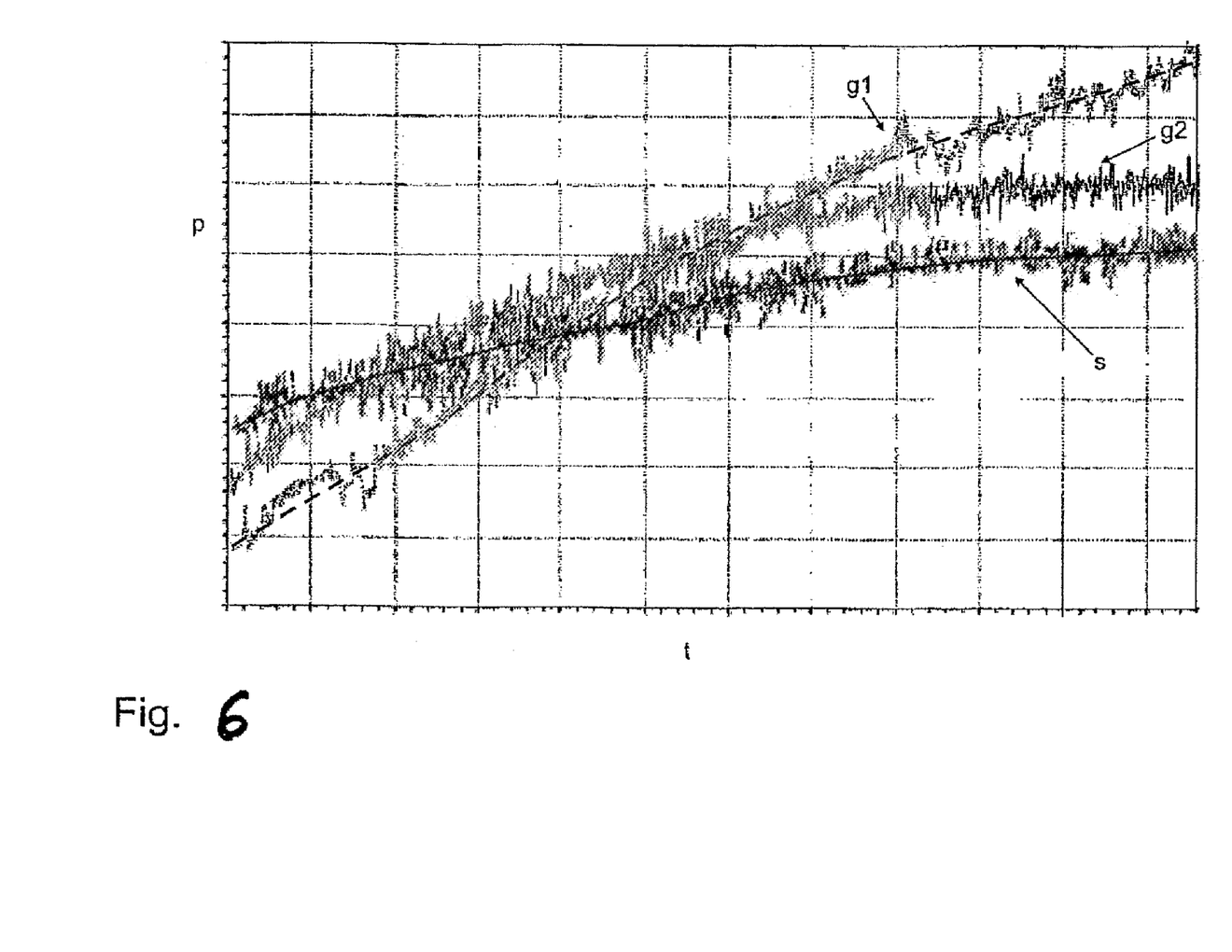
FIG. 6 is a diagram in which an experimentally determined deposit-based pressure loss is plotted over a long operating duration, in different embodiments according to the invention.

FIG. 6 shows experimental results of long-term tests of different heat exchangers having profiled fins under conditions having a high tendency for sooting. Plotted here in each case is the pressure loss p across the heat exchanger against the operating duration t. The data g1 (dashed smooth line) correspond to a straight-toothed profiled fin having relatively long webs. The data g2 (dotted smooth line) correspond to a straight-toothed profiled fin having relatively short webs. The data s (continuous smooth line) correspond to an obliquely-toothed profiled fin having relatively short webs. It can be seen that, at the beginning of operation, the heat exchangers have a flow resistance which increases in the sequence g1-g2-s, for which reason the arrangement s appears initially to be the least suitable. Over the long operating duration, however, it can be seen that the increase in contamination and in the flow resistance takes place more slowly in the sequence g1-g2-s, with the flow resistance increasing in the reverse sequence s-g2-g1 at the end of the test. In the interest of achieving a high degree of uniformity in the operation of the motor vehicle, the obliquely-toothed profiled fin s is most suitable in such cases. A comparison (not illustrated) with non-toothed inserts, for example, corrugated fins, shows that all of the embodiments g1, g2, s have a better degree of uniformity in long-term operation than the corrugated fin embodiments. It is to be noted here that the embodiments g1, g2 lie in the proposed length range $l_i/s$.

FIG. 7 shows a diagram in which the longitudinal pitch "L" is plotted against the angle of the walls W. According to FIG. 7, suitable embodiments are produced at 10° with longitudinal pitches L<approx. 10 mm; at 20° with L<approx. 6 mm; at 30° with L<approx. 4 mm; and at 45° with L<approx. 2 mm.

The minimum longitudinal pitch L is, at all angles, approximately 1 mm. The permissible duct extent $l_i/s$ lies approximately within the same limits as for a straight-toothed profiled fin, with "s" denoting the web spacing transversely with respect to the main flow direction B. In general, longitudinal pitches L<1 mm are difficult to produce for production reasons.

The heat exchanger, in particular the stacked plate heat exchanger, can be formed with or without a housing.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. An exhaust gas recirculation device for cooling exhaust gas from an internal combustion engine, comprising
   a plurality of exhaust flow ducts which are connected to an exhaust gas recirculation system of the internal combustion engine,
   a heat exchange system providing a coolant to flow around the flow ducts in order to dissipate exhaust gas heat,
   an insert which is arranged within and in thermal contact with at least one of the flow ducts, to permit exhaust gas to flow at least partially around the insert in a principal direction of exhaust gas flow, wherein
   the insert comprises a plurality of profiled fins extending laterally across the at least one flow duct and arranged successively in the principal direction of exhaust gas flow, with the individual profiles of the profiled fins which are located successive in the principal flow direction of the exhaust gas being arranged so as to be laterally offset relative to one another.

2. A device according to claim 1, further comprising an oxidation catalytic converter arranged upstream of the plurality of flow ducts.

3. A device according to claim 1, wherein the insert is at least partially provided with a coating for catalytically oxidizing the exhaust gas and wherein the density of the profiles transversely with respect to the exhaust gas flow direction is more than approximately 50 profiles/dm, in particular approximately 75 profiles/dm.

4. A device according to claim 1, wherein the device comprises a stacked plate heat exchanger.

5. A device according to claim 1, wherein the device comprises a tube bundle heat exchanger.

6. A device according to claim 1, wherein the insert is comprised of a an austenitic steel.

7. A device according to claim 1, wherein the insert is comprised of aluminum.

8. A method for cooling exhaust gas from an internal combustion engine, comprising passing exhaust gas through an exhaust gas recirculation device according to claim 1.

9. A device according to claim 1, wherein a density of the profiles transversely with respect to the exhaust gas flow direction is between approximately 20 profiles/dm and approximately 50 profiles/dm.

10. A device according to claim 9, wherein the density of the profiles transversely with respect to the exhaust gas flow direction is between approximately 25 profiles/dm and approximately 45 profiles/dm.

11. A device according to claim 1, wherein the quotient of a length L of the profiles and a throughflow width s of the profiled fins transversely with respect to the exhaust gas flow direction is less than 4.

12. A device according to claim 11, wherein the quotient is less than 2. A device according to claim 8, wherein the quotient is less than approximately 1.5.

13. A device according to claim 1, wherein the profiles of the profiled fins have a length which is no greater than approximately 10 mm.

14. A device according to claim 13, wherein the profiles of the profiled fins have a length which is no greater than approximately 5 mm.

15. A device according to claim 14, wherein the profiles of the profiled fins have a length which is no greater than approximately 3 mm.

16. A device according to claim 1, wherein a height of the profiled fins is between approximately 3.5 mm and 10 mm.

17. A device according to claim 16, wherein the height is between approximately 4 mm and approximately 8 mm.

18. A device according to claim 17, wherein the height is between approximately 4.5 mm and approximately 6 mm.

19. A device according to claim 1, wherein the profiled fins are obliquely-toothed.

20. A device according to claim 19, wherein an angle between the profile side walls and a main direction of the profiled fins is between approximately 1° and approximately 45°.

21. A device according to claim 20, wherein the angle is between approximately 5° and approximately 25°.

22. A device according to claim 21, wherein the angle is between approximately 25° and approximately 35°.

23. A device according to claim 22, wherein the angle is less than approximately 20° and the length L of the profiles is between approximately 1 mm and approximately 10 mm.

24. A device according to claim 22, wherein the angle is between approximately 25° and approximately 35° and the length L of the profiles is between approximately 1 mm and approximately 6 mm.

25. A device according to claim 22, wherein the angle is more than approximately 35° and the length L of the profiles is between approximately 1 mm and approximately 3 mm.

* * * * *

(12) EX PARTE REEXAMINATION CERTIFICATE (10883rd)
United States Patent
Maucher et al.

(10) Number: US 7,478,630 C1
(45) Certificate Issued: Jun. 13, 2016

(54) DEVICE AND METHOD FOR COOLING EXHAUST GAS

(75) Inventors: Ulrich Maucher, Korntal-Münchingen (DE); Jens Ruckwied, Stuttgart (DE)

(73) Assignee: BEHR GMBH & CO. KG, Stuttgart (DE)

Reexamination Request:
No. 90/013,556, Aug. 26, 2015

Reexamination Certificate for:
Patent No.: 7,478,630
Issued: Jan. 20, 2009
Appl. No.: 11/690,481
Filed: Mar. 23, 2007

(30) Foreign Application Priority Data

Mar. 24, 2006 (DE) .......................... 10 2006 014 188

(51) Int. Cl.
| | | |
|---|---|---|
| F02M 25/07 | (2006.01) | |
| F02B 47/08 | (2006.01) | |
| F28F 3/12 | (2006.01) | |
| F28F 1/14 | (2006.01) | |
| F01N 3/04 | (2006.01) | |
| F01N 3/20 | (2006.01) | |
| F28F 3/02 | (2006.01) | |
| F28D 9/00 | (2006.01) | |
| F28D 21/00 | (2006.01) | |

(52) U.S. Cl.
CPC .. *F01N 3/04* (2013.01); *F01N 3/20* (2013.01); *F28D 9/0043* (2013.01); *F28F 3/027* (2013.01); *F01N 2240/02* (2013.01); *F28D 21/0003* (2013.01); *Y02T 10/121* (2013.01); *Y02T 10/20* (2013.01)

(58) Field of Classification Search
None
See application file for complete search history.

(56) References Cited

To view the complete listing of prior art documents cited during the proceeding for Reexamination Control Number 90/013,556, please refer to the USPTO's public Patent Application Information Retrieval (PAIR) system under the Display References tab.

*Primary Examiner* — William Doerrler (57) ABSTRACT

A device for cooling exhaust gas from an internal combustion engine comprises a plurality of flow ducts which are connected to an exhaust gas recirculation system of the internal combustion engine, a heat exchanger for a coolant to flow around the flow ducts in order to dissipate the exhaust gas heat, and an insert 7, 7' which is arranged within at least one of the flow ducts. The insert 7, 7' is in thermal contact with the flow duct such that the exhaust gas flows at least partially around the insert. The insert 7, 7' has profiled fins 8, 8', with profiles 9, 9' which are successive in the flow direction of the exhaust gas being arranged so as to be laterally offset relative to one another.

EX PARTE REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 12 are determined to be patentable as amended.

Claims 4-6 and 8, dependent on an amended claim, are determined to be patentable.

New claims 26-28 are added and determined to be patentable.

Claims 2, 3, 7, 9-11 and 13-25 were not reexamined.

1. An exhaust gas recirculation device for cooling exhaust gas from an internal combustion engine, comprising
   a plurality of exhaust flow ducts which are connected to an exhaust gas recirculation system of the internal combustion engine,
   a heat exchange system providing a coolant to flow around the flow ducts in order to dissipate exhaust gas heat,
   an insert which is arranged within and in thermal contact with at least one of the flow ducts, to permit exhaust gas to flow at least partially around the insert in a principal direction of exhaust gas flow, wherein the insert comprises a plurality of profiled fins extending laterally across the at least one flow duct and arranged successively in the principal direction of exhaust gas flow, with the individual profiles of the profiled fins which are located successive in the principal flow direction of the exhaust gas being arranged so as to be laterally offset relative to one another;
   *wherein the quotient of a length of the inflow region f of the profiles and a throughflow width s of the profiled fins transversely with respect to the exhaust gas flow direction is less than 4.*

12. [A device according to claim 8, wherein the quotient is less than approximately 1.5] *A device according to claim 11, wherein the quotient is less than 2.*

*26. A device according to claim 1, wherein the quotient of a length of the inflow region $I_i$ of the profiles and a throughflow width s of the profiled fins transversely with respect to the exhaust gas flow direction is less than 2.*

*27. A device according to claim 1, wherein the quotient of a length of the inflow region $I_i$ of the profiles and a throughflow width s of the profiled fins transversely with respect to the exhaust gas flow direction is less than 1.5.*

*28. A device according to claim 1, wherein the quotient of a length of the inflow region $I_i$ of the profiles and a throughflow width s of the profiled fins transversely with respect to the exhaust gas flow direction is less than 1.0.*

\* \* \* \* \*